US010636075B2

(12) United States Patent
Rangasamy Kannadasan et al.

(10) Patent No.: US 10,636,075 B2
(45) Date of Patent: Apr. 28, 2020

(54) METHODS AND APPARATUS FOR QUERYING A DATABASE FOR TAIL QUERIES

(71) Applicant: eBay Inc., San Jose, CA (US)

(72) Inventors: Manojkumar Rangasamy Kannadasan, Santa Clara, CA (US); Ajinkya Gorakhnath Kale, San Jose, CA (US)

(73) Assignee: EBAY INC., San Jose, CA (US)

( * ) Notice: Subject to any disclaimer, the term of this patent is extended or adjusted under 35 U.S.C. 154(b) by 917 days.

(21) Appl. No.: 15/064,701

(22) Filed: Mar. 9, 2016

(65) Prior Publication Data

US 2017/0262925 A1  Sep. 14, 2017

(51) Int. Cl.
*G06Q 30/00* (2012.01)
*G06Q 30/06* (2012.01)
(Continued)

(52) U.S. Cl.
CPC ....... *G06Q 30/0633* (2013.01); *G06F 16/248* (2019.01); *G06F 16/2455* (2019.01);
(Continued)

(58) Field of Classification Search
CPC .......... G06Q 30/0633; G06Q 30/0641; G06Q 30/0603; G06F 16/2455; G06F 16/9535; G06F 16/248
(Continued)

(56) References Cited

U.S. PATENT DOCUMENTS 8,458,213 B2  6/2013  Edmonds et al.
8,515,966 B2  8/2013  Jammalamadaka et al.
(Continued)

FOREIGN PATENT DOCUMENTS

CN   108701014 A   10/2018
WO   2017/156065 A1   9/2017

OTHER PUBLICATIONS

"A new approach to query segmentation for relevance ranking in web search," Wu, Haocheng; Hu, Yunhua; Li, Hang; Chen, Enhong. Information Retrieval18.1: 26-50. Springer Science & Business Media; Feb. 2015; Dialog 26pgs; (Year: 2015).*

(Continued)

*Primary Examiner* — Robert M Pond
(74) *Attorney, Agent, or Firm* — Shook, Hardy & Bacon LLP

(57) ABSTRACT

In various example embodiments, techniques for querying a product in a database of a publication system using a tail query are presented. An application interface module receives, from a device of a user, a tail query for a product in the publication system. The tail query has a common term and an uncommon term. A data storage interface module can access, from a search metrics database, a plurality of product categories associated with the common term, and access user behavior data, with the user behavior data including product views corresponding to past search queries in the publication system. A category predictor can determine a first product category from the plurality of product categories for the tail query based on the user behavior data and information derived from the search metrics database. A listing generator can generate an ordered list of product listings associated with the first product category based on the user behavior data.

20 Claims, 7 Drawing Sheets

(51) Int. Cl.
  *G06F 16/248* (2019.01)
  *G06F 16/2455* (2019.01)
  *G06F 16/9535* (2019.01)
(52) U.S. Cl.
  CPC ..... *G06F 16/9535* (2019.01); *G06Q 30/0603* (2013.01); *G06Q 30/0641* (2013.01)
(58) Field of Classification Search
  USPC ...................................................... 705/26, 27
  See application file for complete search history.

(56) References Cited

U.S. PATENT DOCUMENTS

| | | | | |
|---|---|---|---|---|
| 2008/0244429 | A1* | 10/2008 | Stading | G06F 16/9038 715/764 |
| 2010/0257171 | A1* | 10/2010 | Shekhawat | G06F 16/353 707/738 |
| 2011/0040752 | A1 | 2/2011 | Svore et al. | |
| 2011/0258149 | A1* | 10/2011 | Kanungo | G06N 20/00 706/12 |
| 2012/0123863 | A1* | 5/2012 | Kaul | G06Q 30/02 705/14.52 |
| 2012/0130981 | A1 | 5/2012 | Risvik et al. | |
| 2012/0259844 | A1 | 10/2012 | Yuan et al. | |
| 2015/0142827 | A1* | 5/2015 | Hasan | G06Q 30/02 707/748 |
| 2015/0324469 | A1 | 11/2015 | Keyngnaert et al. | |
| 2016/0063115 | A1 | 3/2016 | Ayan et al. | |
| 2016/0321365 | A1 | 11/2016 | Duan et al. | |
| 2017/0193072 | A1 | 7/2017 | Vase et al. | |

OTHER PUBLICATIONS

"6 Tips to Help You Build Your SEO Strategy," Low, Jamie. Book Business11.10: 32-33. North American Publishing Company North American Publishing Company d/b/a NAPCO; Dec. 2008; Dialog 5pgs; (Year: 2008).*
First Action Interview Pre-Interview Communication received for U.S. Appl. No. 14/984,578, dated Oct. 16, 2018, 7 pages.
Response to First Action Interview—Pre-Interview Communication filed on Nov. 16, 2018 for U.S. Appl. No. 14/984,578, dated Oct. 16, 2018, 4 pages.
International Preliminary Report on Patentability received for PCT Application No. PCT/US2017/021276, dated Sep. 20, 2018, 7 pages.
"International Application Serial No. PCT/US2017/021276, International Search Report dated May 22, 2017", 2 pgs.
"International Application Serial No. PCT/US2017/021276, Written Opinion dated May 22, 2017", 5 pgs.
First Action Interview—Office Action Summary received for U.S. Appl. No. 14/984,578, dated Feb. 20, 2019, 14 pages.
Response to First Action Interview—OA Summary filed on Apr. 11, 2019 for U.S. Appl. No. 14/984,578, dated Feb. 20, 2019, 16 pages.
Advisory Action Received for U.S. Appl. No. 14/984,578, dated Aug. 12, 2019, 2 pages.
Final Office Action received for U.S. Appl. No. 14/984,578, dated Jun. 5, 2019, 11 pages.
Response to Final Office Action filed on Jul. 29, 2019 for U.S. Appl. No. 14/984,578, dated Jun. 5, 2019, 12 pages.
European Search Report Received for European Patent Application No. 17763957.2 dated Jul. 30, 2019, 6 pages.
Pre-Appeal Brief Filed on Aug. 30, 2019 for U.S. Appl. No. 14/984,578, 7 pages.
Appeal Brief filed for U.S. Appl. No. 14/984,578, dated Nov. 26, 2019, 26 pages.
Decision on Pre-Appeal Brief Received for U.S. Appl. No. 14/984,578, dated Nov. 4, 2019, 2 pages.
Interview Summary Received for U.S. Appl. No. 14/984,578 dated Nov. 13, 2019, 2 pages.
Non Final Office Action Received for U.S. Appl. No. 14/984,578, dated Feb. 27, 2020, 12 pages.

* cited by examiner

METHODS AND APPARATUS FOR QUERYING A DATABASE FOR TAIL QUERIES

TECHNICAL FIELD

Embodiments of the present disclosure relate generally to the technical field of data processing for a database query, and specifically to publishing accurate product listings based on a tail query. More particularly, but not by way of limitation, techniques for querying a database by associating a product category with a term in the tail query are described.

BACKGROUND

Product listings are stored in a database of a publication system. Conventionally, a user can submit a search query for products listed. The publication system can generate product listings based on the search query. For example, a search query can initially list of product items to be viewed.

The publication system allows a user to search for items using a search query having a plurality of terms. In some instances, a term in the search query may be a new term or an uncommon term. A search query having a new term or an uncommon term is known as a tail query. Alternatively, a search query having only common terms is known as a head query. In some instances, the product listings generated by the publication system may not be accurate for a tail query search.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
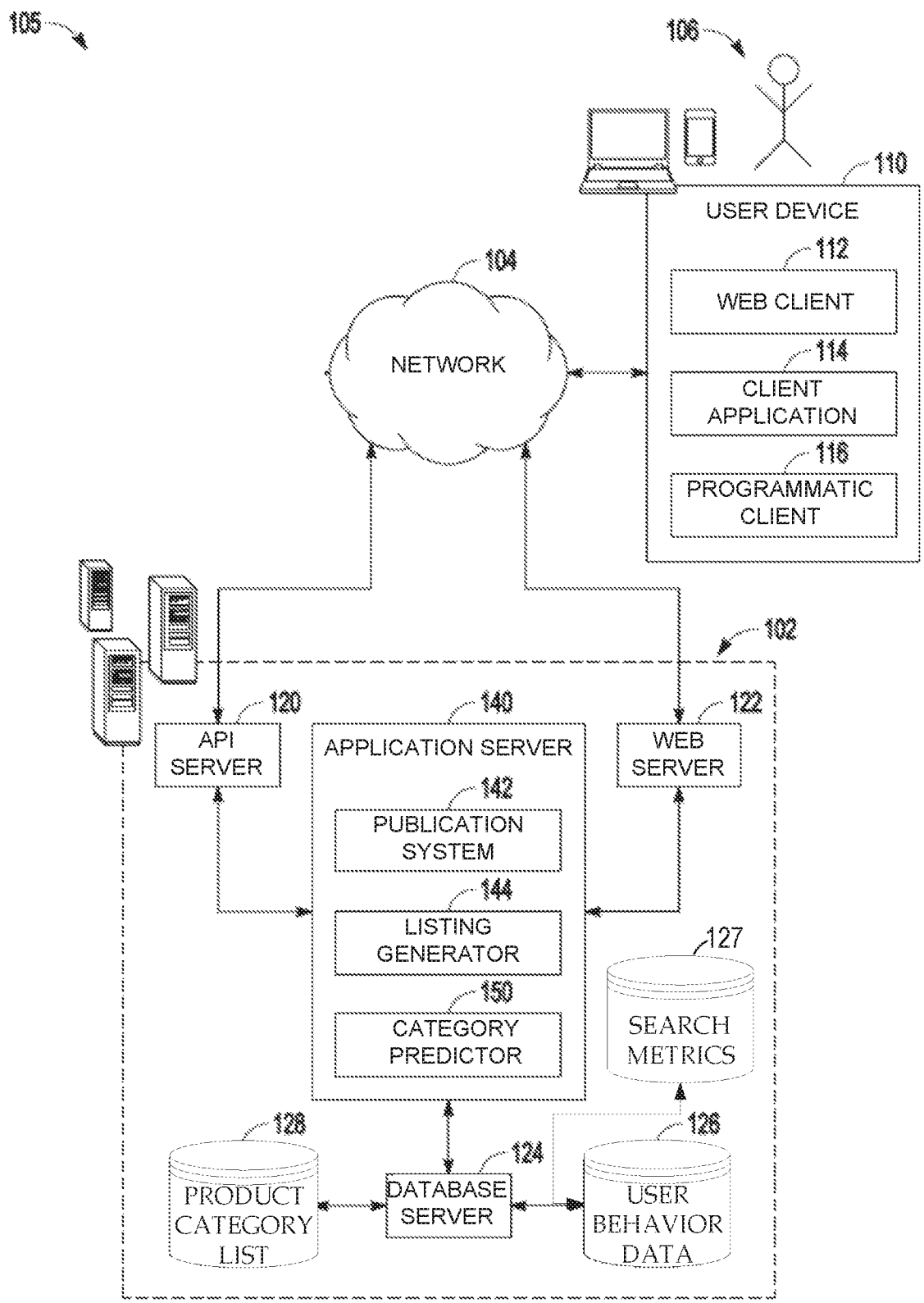
FIG. 1 is a block diagram illustrating a networked system, according to some example embodiments.

The description that follows includes systems, methods, techniques, instruction sequences, and computing machine program products that embody illustrative embodiments. In the following description, for the purposes of explanation, numerous specific details are set forth in order to provide an understanding of various embodiments of the subject matter discussed herein. It will be evident, however, to those skilled in the art, that embodiments of the inventive subject matter may be practiced without these specific details. In general, well-known instruction instances, protocols, structures, and techniques are not necessarily shown in detail.

According to some embodiments, a publication system can generate search metrics based on search queries on the publication system and subsequent user interactions with a search result corresponding to a search query. The publication system can be an online marketplace, a search engine (e.g., links to third-party sites to buy or sale products, a review site (e.g., reviews of products are generated), and so on.

A search query can have a plurality of search terms. A tail query has a plurality of terms including a common term and an uncommon term. Alternatively, a head query may only have common terms. A common term is a term that has a term-category association in a search metrics (e.g., search metrics database). An uncommon term does not have a term-category association in the search metrics. A new search term or a search term that has not been frequently searched are example of uncommon terms. Techniques described herein allow for the publication system to generate an accurate product listing for a tail query search.

According to some embodiments, the publication system trains a machine learning algorithm to detect an association between a keyword token (e.g., common term) in a head query to an item by mining the details in items clicked on in response to the head token search. Additionally, multiple token-category associations in a query are combined using vector algebra to return a ranking of related categories for a tail query with an uncommon term. For example, when a user searches for "boat shoes size 10" the category predictor can determine that "boat" is associated with the "footwear" product category, and not an actual watercraft. In another example, when the user searches for "flip-flop size 10 turquoise" and the term "turquoise" is a new term, the category predictor can determine that "turquoise" is product description (e.g., color) of "flip-flop" or "footwear." In some instances, the uncommon terms in the tail query are ignored and the list is generated based on the common ones.

A search metric database stores the generated search metrics, such as an association between search term and product category. In some instance, the search term can be associated with a plurality of product categories.

Additionally, a user behavior database stores the user interaction in response to receiving a search result. The user behavior data can be generated based on the user interactions over a predetermined period of time (e.g. one day, one week).

According to some embodiments, a publisher generates more accurate search results based on the user behavior data and the search metrics. The search metrics and the user behavior data can be processed by the publisher both offline and at runtime in order to generate a faster search. For example, a search metric collected for every query during a predetermined time period (e.g., a week) can be used to determine a set of categories that users are interested in based on the user interactions and purchases on the publication system. The search metrics and the set of categories can be refreshed or updated periodically based on new search data and user behavior data.

With regards to a head query, one of the reasons that the product category associated with the head query is easily determined is because the head query by definition has been frequently searched or recently searched. For example, the head query may have to have been recently searched (e.g., in the last few weeks) by users, and the user interactions with the search results allow a category predictor to determine and associate product categories with the head query. Additionally, or alternatively, the head query may have to be searched a predetermined minimum number of times (e.g., at least 20, 100, 5000) in order to generate a high confidence level for the category predictor to accurately determine the association of a product category with the head query.

As a result, the category predictor can accurately determine a set of product categories for a head query search. Using the set of product categories for the head query, a listing generator can use a static lookup table using a search metric at runtime to enhance the search experience for a user by quickly generating a list of product listings. Subsequently, the publication system can publish the list of product listings in a search result for the head query search.

In contrast, with current implementations, the listing generator may not be able to use a static lookup table for a tail query search because the uncommon term may not be associated with a product category. As a result, the search experience of the user is diminished. For example, the publishing of the search results for a tail query search can be slower. Additionally, inaccurate product listings (e.g., listings that are not relevant to the user) can be generated by the listing generator for a tail query search.

As mentioned, the tail query may not be associated with search metrics used to improve the search experience at the publication system. For example, the search metrics include the product category associated with a term. In some instances, the product categories may not be associated with search terms in the tail query because the search terms have been searched infrequently, and thus lack a search metric. Due to a lack of a search metric, with current implementations, the category predictor may not be able to determine a set of product categories for the tail query. As a result, the search experience at runtime in the publication system may be slow for tail queries or new queries.

Techniques described herein can improve the search experience for a tail query by determining a product category for a search term in the tail query. For example, a category predictor can determine a product category for the tail query. The product category comes from a list of product categories in the publication system. For example, the publication system has a catalog having a plurality of product categories. The product category has similar types of products listed in the publication system. The category predictor can determine a product category of interest based on machine learning techniques using the search metrics and the user behavior data. Example of machine learning techniques are later described in FIG. 4.

With reference to FIG. 1, an example embodiment of a high-level client-server-based network architecture 105 is shown. A networked system 102, in the example form of a network-based publication system 142 or listing generator 144, provides server-side functionality via a network 104 (e.g., the Internet or a wide area network (WAN)) to one or more user devices 110 (also referred to as a "client device"). FIG. 1 illustrates, for example, a web client 112, client application 114, and a programmatic client 116 executing on user device 110. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The user device 110 may comprise, but is not limited to, a mobile phone, desktop computer, laptop, personal digital assistant (PDA), smart phone, tablet, ultra-book, netbook, laptop, multi-processor system, microprocessor-based or programmable consumer electronic, game console, set-top box, or any other communication device that a user may utilize to access the networked system 102. In some embodiments, the user device 110 may comprise a display module to display information (e.g., in the form of user interfaces). In further example embodiments, the user device 110 may comprise one or more of a touch screen, accelerometer, gyroscope, camera, microphone, global positioning system (GPS) device, and so forth. The user device 110 may be a device that is used by a user 106 to perform a transaction involving items within the networked system 102. In one embodiment, the networked system 102 is a network-based marketplace that responds to requests for product listings, publishes publications comprising product listings (e.g., item listings) of products available on the network-based marketplace, and manages payments for these marketplace transactions.

Each user device 110 may include one or more applications (also referred to as "apps") such as, but not limited to, a web browser, messaging application, electronic mail (email) application, a marketplace application, and the like. In some embodiments, if the application is included in a given user device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, or to verify a method of payment). Conversely, if the e-commerce site application is not included in the user device 110, the user device 110 may use its web browser to access the e-commerce site (or a variant thereof) hosted on the networked system 102.

One or more users 106 may be a person, a machine, or other means of interacting with the user device 110. In example embodiments, the user 106 is not part of the network architecture 105, but may interact with the network architecture 105 via the user device 110 or other means. For instance, the user 106 provides input (e.g., touch screen input or alphanumeric input) to the user device 110 and the input is communicated to the networked system 102 via the network 104. In this instance, the networked system 102, in response to receiving the input from the user 106, communicates information to the user device 110 via the network 104 to be presented to the user 106. In this way, the user 106 interacts with the networked system 102 using the user device 110.

An application program interface (API) server 120 and a web server 122 are coupled to, and provide programmatic and web interfaces respectively to, one or more application server 140. The application server 140 hosts the publication system 142, the listing generator 144, and category predictor 150, each of which may comprise one or more modules or applications and each of which may be embodied as hardware, software, firmware, or any combination thereof. The application server 140 is, in turn, shown to be coupled to one or more database servers 124 that facilitate access to information storage repositories (e.g., user behavior data 126, search metrics 127, product category list 128, listing database, etc.).

The user behavior database stores the user behavior data 126. The user behavior data 126, includes, but is not limited to, a user's rating based on previous transactions, communication messages with other members, items previously sold by the user, items previously purchased by the user, items recently searched by the user in current session, items searched by the user in previous sessions, and other derived information. In some instance, the user interactions for a current session are known as current session data, and the user interactions for previous sessions are known as user behavior data 126.

Additionally, the user behavior data includes usage logging, which is the user interactions with the search results pages and product description pages. In some instances, the usage logging is already logged by the publication system for debugging issues, reconciliation, and other offline analysis. The usage logging is accessed either on the client side (e.g., client device) or on the server side (e.g., online marketplace) of the search experience engine. Furthermore, the user behavior data is consolidated to avoid duplication and to retain all the search contexts together within a search session of the user. A search session can include a plurality of search requests during a continuous period of time that the user is logged into the publication system.

The search metrics database stores the search metrics 127. The search metrics include, but are not limited to, product category association, category demand, impressions, product views, number of products bought, click-through-rate, and so on. The search metrics include statistics (e.g., mean, median, standard deviation) for the category demand, the impressions, the product views, the number of products bought, and the click-through-rate. The product category association is a set of product categories associated with a specific search term. The list of categories that users were interested in after issuing a given search query is an example of the category demand. The number of times the search context was issued in the search engine of the publication system is an example of an impression. The product views denote the number of views a product was viewed by a user after being presented the list of product listings for a search query. The products bought represent the number of a specific product bought after issuing the search context (e.g., being presented the list of product listings for a search query). The click-through-rate denotes the rate (e.g., ratio) of a user clicking the product listing from the list of product listings being presented for a search query. Additionally, the user behavior data can include similar metrics and statistics that are collected on other content shown on the search results page.

According to some embodiments, the search metrics 127 are collected in real-time and used to optimize subsequent search responses. For example, the category predictor 150 can determine the category of interest for a given query and promote the product listings from the determined category. As a result, the search experience is improved for the user, since the user is able to view more relevant product listings.

The product category list 128 includes the different product categories in the publication system. For example, the publication system has a catalog of product listings that are labeled in certain product categories. A product category has similar types of products listed in the publication system. Examples of product categories include footwear, pants, sweaters, electronics, handbags, and so on. Additionally, a product category can have subcategories. For example, subcategories for electronics can include smartphones, televisions, desktops, laptops, and so on.

The product category list 128 can be derived from information accessed from a listing database. The listing database is a storage device that stores information to be posted (e.g., publications or listings) to the publication system 142. The listing database comprises information for items currently listed on the publication system such as product category, in accordance with example embodiments. The listing database can include item attributes for a specific item, such as product information, product category, product sub-category, historical price data, and a product description for the specific item.

The publication system 142 provides a number of publication functions and services to a user 106 that access the networked system 102. The listing generator 144 generates product listings based on a search query. For example, the listing generator 144 uses the product category association of a search term to generate a ranked list of product listings. While the publication system 142 and listing generator 144 are shown in FIG. 1 to both form part of the networked system 102, it will be appreciated that, in alternative embodiments, each system 142 and 144 may form part of a service that is separate and distinct from the networked system 102. In some embodiments, the listing generator 144 may form part of the publication system 142.

The category predictor 150 provides functionality operable to determine a product category for a search term, in accordance with some embodiments. As described herein, the category predictor 150 accesses the user behavior data 126 and the search metrics 127 to determine sets of product categories for a search query. The product categories are derived from the product category list 128. Subsequently, the listing generator 144 produces an ordered list of product listings based on the determined set of product categories for the search term. The publication system 142 publishes the search results in response to the search query. The search results include the ordered list of product listings generated by the listing generator 144. Additionally, when the search query is a tail query, the search metrics 127 are updated by the application server 140 to include the determined set of product categories associated with the tail query.

Further, while the client-server-based network architecture 100 shown in FIG. 1 employs a client-server architecture, the present subject matter is of course not limited to such an architecture, and could equally well find application in a distributed, or peer-to-peer, architecture system, for example. Publication system 142, listing generator 144, and category predictor 150 can also be implemented as stand-alone software programs, which do not necessarily have networking capabilities.

In example embodiments, the web client 112 accesses the application server 140 via the web interface supported by the web server 122. Similarly, the programmatic client 116 accesses the various services and functions provided by the application server 140 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
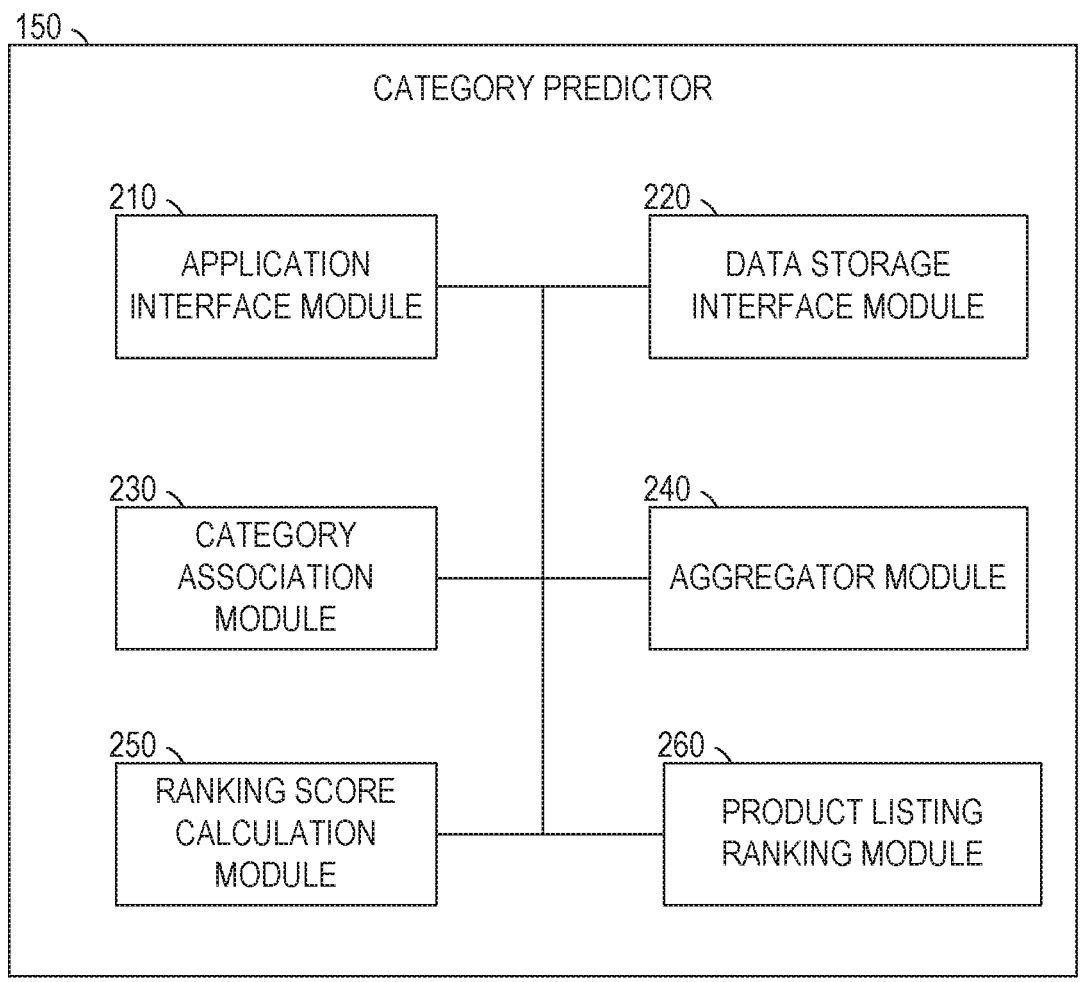
FIG. 2 is a block diagram illustrating an example embodiment of the category predictor, according to some example embodiments.

FIG. 2 is a block diagram illustrating an example embodiment of the category predictor 150 of FIG. 1 including multiple modules forming at least a portion of the network architecture 105 of FIG. 1. The modules 210-260 of the illustrated category predictor 150 include an application interface module 210, a data storage interface module 220, a category association module 230, an aggregator module 240, a ranking score calculation module 250, and a product listing ranking module 260. In some embodiments, the components of the category predictor 150 are included in the application server 140 of FIG. 1. However, it will be appreciated that in alternative embodiments, one or more components of the category predictor 150 described below are included, additionally or alternatively, in other devices, such as one or more of the user devices 110 of FIG. 1. It will also be appreciated that the category predictor 150 is deployed in systems other than publication systems.

The modules 210-260 of the category predictor 150 are hosted on dedicated or shared server machines that are communicatively coupled to enable communications between server machines. One or more of the modules 210-260 are deployed in one or more datacenters. Each of the modules 210-260 is communicatively coupled to the other modules 210-260 and to various data sources, so as to allow information to be passed between the modules 210-260 of the category predictor 150 or so as to allow the modules 210-260 to share and access common data.

The application interface module 210 is a hardware-implemented module that facilitates communication of data between the category predictor, the listing generator 144, the publication system 142, the user device 110, and other devices connected to the network 104. In particular, the application interface module 210 provides a user-facing graphical user interface (GUI) for interfacing with one or more user devices 110, thus providing a bi-directional interface. For example, the application interface module 210 interfaces with the API server 120 to provide a programmatic interface to user device 110 or to provide a web interface to the user device 110. As such, the application interface module 210 facilitates the providing of functions, webpages, data, code, or other web resources between the category predictor 150 and the user device 110. For example, the category predictor 150 receives the search query from the user device 110 using the application interface module 210.

In operation, the category predictor 150 receives data from the one or more user devices 110 (e.g., via the application interface module 210). The received data from the user devices 110 correspond to the search query. The search query can include a plurality of search terms. As previously mentioned, a tail query includes a search term that is an uncommon term or a new term.

The data storage interface module 220 is a hardware-implemented module that facilitates accessing data for the category predictor 150. In an example embodiment, the data storage interface module 220 interfaces with the user behavior data 126, the search metrics 127, and the product category list 128 of FIG. 1.

The category association module 230 is a hardware-implemented module that determines a set of product categories associated with a search term. The set of product categories are derived from the product category list 128 of FIG. 1. The category association module 230 receives a search query from the application interface module 210. The search query can include a plurality of search terms, where one or more of the search terms is uncommon or new. Additionally, the category association module 230 accesses, via the data storage interface module 220, the search metrics 127 and the user behavior data 126 to determine a product category for a search term.

The aggregator module 240 is a hardware-implemented module that aggregates the set of product categories for each search term in the search query to generate a master set of product categories. In some instances, the master set of product categories only includes a product category that is in each set of product categories for each term. Alternatively, the master set of product categories may only include one master product category. For example, the category predictor determines that based on the search query, the user intended to search for products in the master product category. In operation, the aggregator module 240 receives a set of product categories for each search term from the category association module 230 in order to generate the master set of product categories.

The ranking score calculation module 250 is a hardware-implemented module that calculates a ranking score for each product listing in the master set of product categories based on the user behavior data 126 and the search metrics 127. The master set of product categories is received from the aggregator module 240. The product listings are accessed from the listing database.

The product listing ranking module 260 is a hardware-implemented module that orders the product listings based on the ranking score for each of the product listings in the master set of product categories. The product listing ranking module 260 generates an ordered list for the product listings. The ranking score is received from the ranking score calculation module 250. Additionally, the ordered list is transmitted to the listing generator 144 in FIG. 1.

In some instances, a user logs into the publication system and initiates a search query using the application interface module 210. The publication system 142 presents a search result having a list of product listings in response to the search query. The search result is also based on the search context. The search context includes the user's location, search query text, category of interest, and a combination of various attributes associated with the product listings. A search query can be a free form text that is entered by the user, or a combination of free form text and structured metadata provided by the search engine. In some instances, categories in the search context represent the organization of the product listings in a grouped hierarchical taxonomy. Product listing attributes provided by the search engine vary from one product to another. For example, product listing attributes include brand, color, model, size, fit, price, and so on.

Based on the search context, the product listings are generated from a listing database. In some instances, the listing database includes a repository or storage index for a quicker retrieval of product listings. Additionally, the product listings are ranked by the ranking score calculation module 250 based on various factors present in the search context. The product listing is then displayed to the user as an ordered list using the product listing ranking module 260. In some instances, additional content is presented in the search result page in addition to the product listings.

The additional content includes a user interface to change the search context, promotional listings relevant to the current search context, advertisements (e.g., textual and graphical), specialized product deals, informational content related to the search context, and personalized content related to the user. The information content includes historical pricing for the product listings. The personalized content includes targeted content specific to this user such as historical search contexts, historically viewed product listings, recommended product listings for the user, and so on.

As previously mentioned, the publication system can include a plurality of databases that store the search metrics 127 and the user behavior data 126. The category predictor can determine the product categories associated with a search query based on the search metrics 127 and the user behavior data 126. Using the determined product categories, the listing generator 144 and the publication system 142 present the relevant product listings on the user device 110.

Additionally, the relevant product listings are presented on a search results page. For example, the search results page is a rendering of the product listings that are relevant to the search query. The search results page encompasses any such rendering on a web, mobile, or wearable device. The search results page can also be considered as a list of condensed versions of product description pages. In some instances, the user 106 navigates to the product description page by clicking on one of the product listings present in the search result page.

Figure 3:
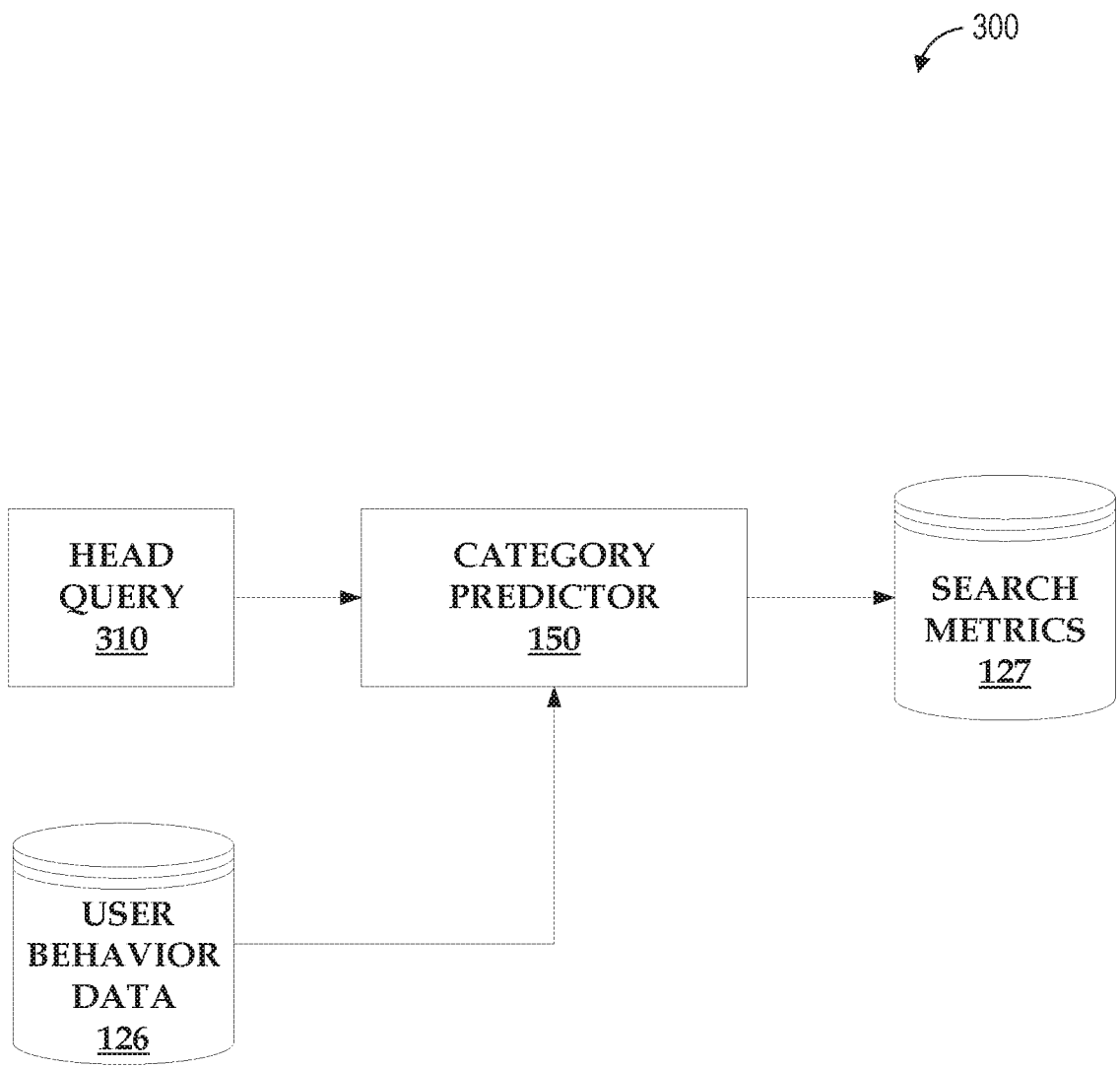
FIG. 3 illustrates an example process diagram of determining a product category for a head query using the category predictor, according to some embodiments

FIG. 3 illustrates an example process 300 of determining a product category for a head query 310 using the category predictor 150, according to some embodiments. In example embodiments, the category predictor 150 calculates the category demand by aggregating query metrics from past user interactions (e.g., user behavior data 126) with the search result pages and product description pages. Using the behavior data 126 associated with a head query 310 (e.g., commonly searched terms), the category predictor 150 can associate a search term in the head query 310 with a specific product category. In some instances, the search term can be associated with a plurality of product categories. Subsequently, the category predictor 150 stores the association between the search term and the product category in the search metrics 127. In future head queries 310, the association between the search term and the product category is used to improve the accuracy and the response time of publishing the search results.

Figure 4:
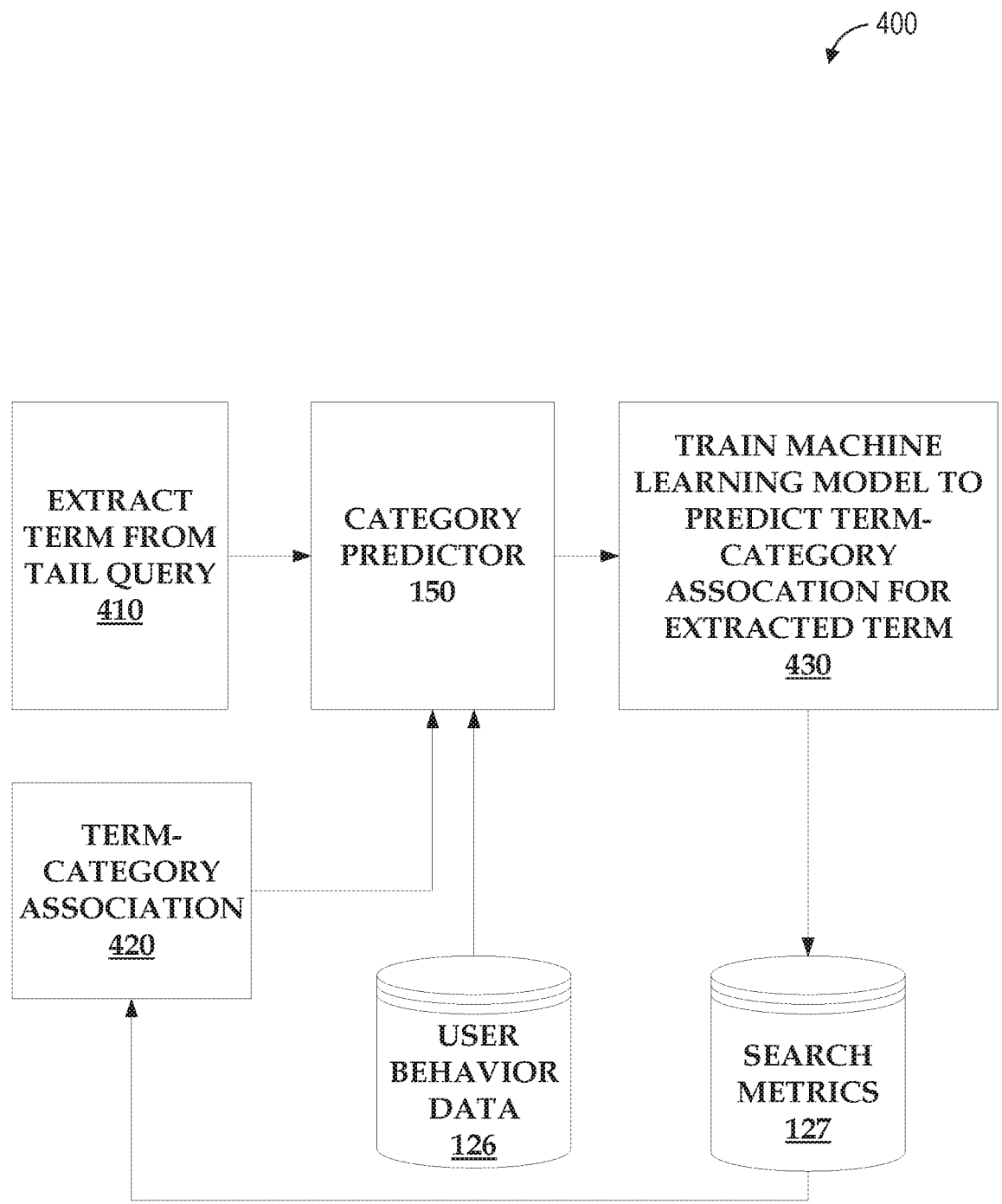
FIG. 4 illustrates an example process diagram of training the category predictor 150 using machine learning techniques, according to some embodiments.

FIG. 4 illustrates an example process 400 of training the category predictor 150 using machine learning techniques, according to some embodiments. In some instances, the process 400 can be performed offline on a predetermined basis (e.g., nightly). In example embodiments, the search terms are extracted from the received head query at operation 410. For example, the application interface module 210 of FIG. 2 can extract a text term from the received head query. One or more of the extracted terms are either a new term or an uncommon term. Each extracted text term is an example of a search term.

At operation 420, the term-category association is accessed from the search metric 127 by the category predictor 150. For example, the term-category association is the set of product categories associated with a known search term. Additionally, the category predictor 150 accesses the user behavior data 126 to predict the term-category association of the tail query.

At operation 430, the category predictor 150 trains the machine learning model to predict a term-category association for the term extracted at operation 410, using the data accessed at operation 420. In some instances, the category predictor 150 can determine a set of product categories associated with the new or uncommon term based on the user behavior data 127 and the term-category associations of similar terms. For example, "flip-flop" can be a new or uncommon term, and the category predictor 150 can determine that "flip-flop" is associated with the "footwear" category.

Examples of machine learning models include a recurrent neural networks (RNN) model, Word2Vec model, nearest neighbors, a long-short term memory (LSTM) model, hidden markov model (HMM), a convolutional neural networks (CNN) model, support vector machines (SVM), a logistic regression model, and so on. For example, the category predictor 150 can use the machine learning models to determine a category for an unknown search term in a tail query based on the term-category associations for the known search terms in the tail query.

Subsequently, the term-category association (e.g., set of product categories associated with the tail query) can be stored in the search metrics 127.

Figure 5:
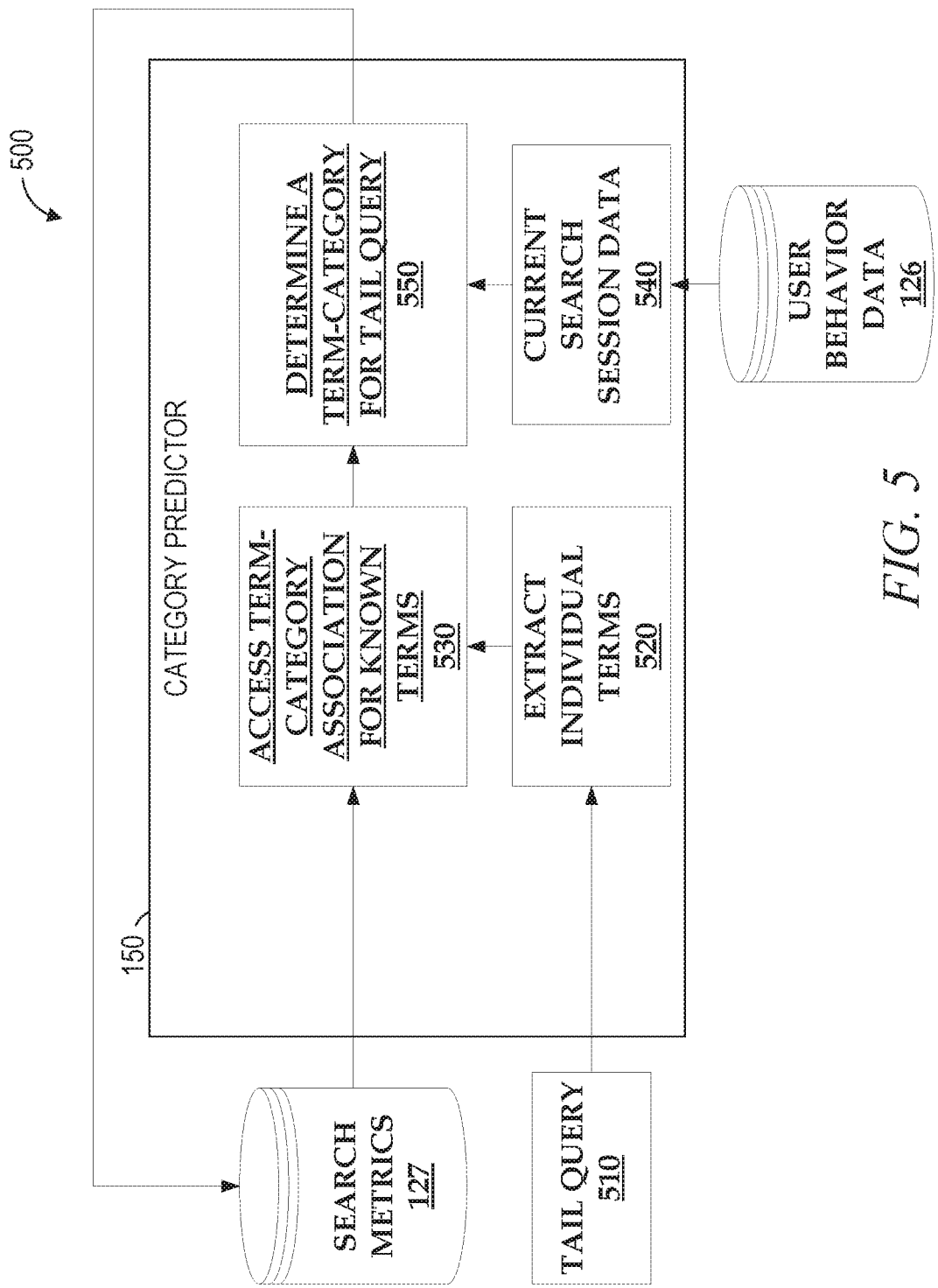
FIG. 5 illustrates an example process diagram of determining a category for an uncommon term in a tail query, according to some embodiments.

FIG. 5 illustrates an example process 500 of determining the term-category association for a tail query, according to some embodiments. At operation 510, the tail query is received by the category predictor 150. The tail query is separated into individual query tokens at operation 520. For example, a query token is an example of a single search term. At operation 530, the category predictor 150 accesses, from the search metric 127, the term-category associations for the individual terms that are known. As previously discussed, the search metrics 127 include a set of product categories for known terms (e.g., head query). At operation 540, the category predictor 150 accesses, from the user behavior data 126, current search session data of the user 106. For example, the current search session data include the captured user data (e.g., previous search terms, previously purchased items, previously viewed items) for the current session that the user 106 is logged into the publication system. At operation 550, the category predictor 150 determines a term-category association for the tail query based on the term-category association for the known terms and the current search session data. For example, the category predictor determines a product category for the tail query. Subsequently, the search metrics 127 can be updated with the new term-category determined at operation 550.

Techniques described herein allow for a category prediction for a tail query or a new query using a plurality of machine learning models and user behavior information derived from the publication system.

In some instances, the publisher incorporates category predictions in the search experience of a user to enhance the user experience. For example, a typical search system can have a repository or metric storage system for storing the query metrics. The metrics can be used during offline analysis and runtime behavior of the search queries. Additionally, the query metrics optimize and enhance the search experience for the users.

Furthermore, the term-category association stored in the search metrics 127 can further enhance the search experience by predicting the product category for tail and new queries by incorporating the contexts present in the individual term (e.g., query tokens). The category predictor 150 determines the product category for a tail query at runtime by accessing the term-category associations of individual query tokens. For example, head tail queries have individual query tokens that have predetermined category features.

Figure 6:
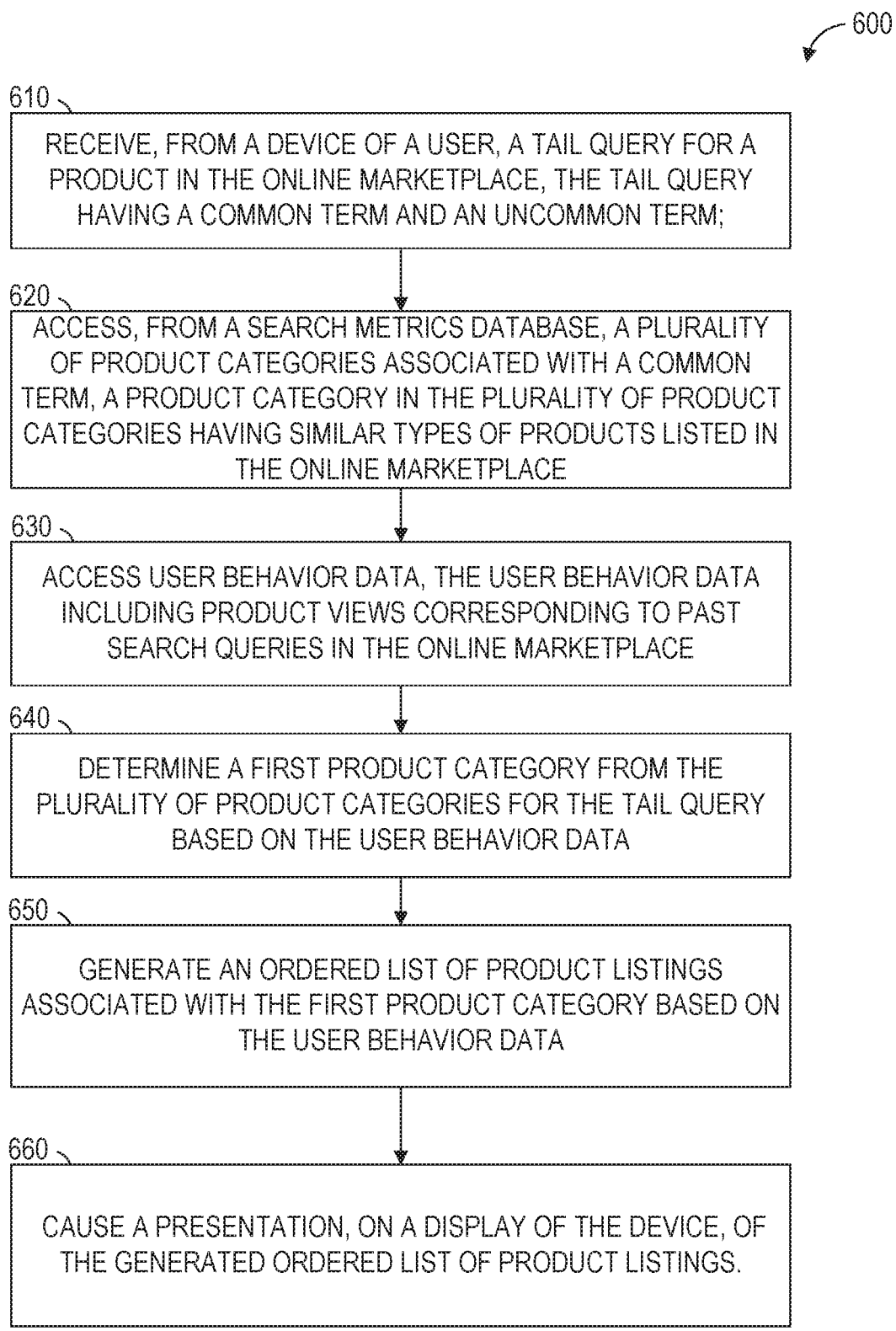
FIG. 6 is a flowchart illustrating an example method of generating a product listings for a tail query, according to some embodiments.

FIG. 6 is a flowchart illustrating operations of the publication system in performing a method 600 for determining the product category for a tail query, according to some example embodiments. Operations in the method 600 may be performed by the publication system, using the publication system 142, the listing generator 144, and the category predictor 150 described above with respect to FIGS. 1 and 2. As shown in FIG. 6, the method 600 includes operations 610, 620, 630, 640, 650, and 660. The example method 600 will be described below, by way of explanation, as being performed by the category predictor 150. It will be appreciated, however, that the operations of the example method 600 can be performed in any suitable order by any number of the modules shown in FIG. 1, FIG. 2 and FIG. 7. Unless specifically stated otherwise, the terms "a" or "an" are herein used, as is common in patent documents, to include one or more than one instance. As used herein, the conjunction "or" refers to a non-exclusive "or," such as "and/or," unless specifically stated otherwise.

At operation 610, the application interface module 210 receives, from a device (e.g., user device 110) of a user (e.g., user 106), a tail query for a product in a publication system. The tail query has a plurality of terms including a common term and an uncommon term. Alternatively, a head query may only have common terms. As previously discussed, the common term is a term that has a term-category association in the search metrics 127. The uncommon term does not have a term-category association in the search metrics 127. A new search term or a search term that has not been frequently searched are example of uncommon terms. The tail query is received by the application server 140 from the user device 110 via the network 104.

At operation 620, the category predictor 150 accesses, from a search metrics database (e.g., search metrics 127), a plurality of product categories associated with the common term. For example, a product category (e.g., footwear, pants, sleepwear, jacket, suits) in the plurality of product categories has similar types of products listed in the publication system. The search metrics 127 store the term-category associations for the common terms. Additionally, as the category predictor 150 determines new term-category associations for an uncommon term, the new term-category associations are also stored in the search metrics 127. FIG. 3 describes the techniques for determining a term-category association for a head query, in accordance with an example embodiment. The search metrics 127 can be accessed by the data storage interface module 220 of FIG. 2.

At operation 630, the category predictor 150 accesses user behavior data (e.g., user behavior data 126) from the user behavior database. In some instances, the user behavior data includes product views corresponding to past search queries in the publication system. The user behavior data 126 can include behavior data associated with the users (e.g., all users) of the publication system. Additionally, or alternatively, the user behavior data 127 may only be the behavior data of the user 106 performing the search. The behavior data 126 can be accessed by the data storage interface module 220 of FIG. 2. For example, the category predictor 150 can determine (e.g., predict) a category for an unknown search term in a tail query based on previously-clicked product listings in current session, previously search queries in the current session, previously purchased item, and so on.

As previously mentioned, a user behavior database stores the user interaction in response to receiving a search result. The user behavior data is generated based on the user interactions over a predetermined period of time (e.g. one day, one week). The category predictor can determine a more accurate product category, and thus a better search result, based on the user behavior data 126 and the search metrics 127. In some instances, the search metrics 127 and the user behavior data 126 are processed by the publisher both offline and at runtime in order to generate faster search results. For example, the search metrics 127 collected for every query during a predetermined time period (e.g., a week) can be used to determine the set of product categories at operation 620.

The user behavior data 126 includes, but is not limited to, a user's rating based on previous transactions, communication messages with other members, items previously sold by the user, items previously purchased by the user, items recently searched by the user in current session, items searched by the user in previous sessions, and other derived information. Additionally, the user behavior data includes usage logging, which is the user interactions with the search results pages and product description pages. In some instances, the user interactions of the user 106 for a current session are known as current session data, and the user interactions of all users from previous sessions are known as user behavior data 126.

For example, the method 600 can further include receiving, from the user device 110, login credentials to initiate the current session, and the application server 140 initiating the current session using the login credentials.

At operation 640, the category predictor 150 determines, using a processor, a first product category from the plurality of product categories for the tail query based on the user behavior data 127. FIG. 4 and FIG. 5 describe techniques for determining a product category (e.g., first product category) for a tail query using the search metrics 127 and the user behavior data 126, according to some embodiments. Operation 640 can be performed by a processor configured by the category association module 230 or another module in the category predictor 150. In some instances, the processor can be the processor 702 later described in FIG. 7.

Additionally, operation 640 can further include the category predictor 150 determining a second product category from the plurality of product categories for the tail query based on the user behavior data 126, the search metrics, and the current session data. Furthermore, the ordered list of product listings later generated at operation 650 can include product listings associated with the second product category.

In some instances, the first product category and the second product category are determined based on statistics derived from the search metrics 127. The search metrics database stores the search metrics 127. The search metrics include, but are not limited to, term-category association (e.g., product category association), category demand, impressions, product views, number of products bought, click-through-rate, and so on. The search metrics include statistics (e.g., mean, median, standard deviation) for the category demand, the impressions, the product views, the number of products bought, and the click-through-rate.

In some instances, method 600 further includes accessing current session data of a current session for the user. The current session data includes a previous search query in the current session, items previously purchased in the current session, and items searched by the user in the current session. Additionally, the determining of the first product category and the second product category at operation 640 is further based on the accessed session data.

At operation 650, the listing generator 144 generates an ordered list of product listings associated with the first product category based on the user behavior data 127. In some instances, the ordered list of product listings is further generated based on the search metrics 127 (e.g., statistics derived from the search metrics database). Additionally, the ordered list of product listings can be further based on the current session data.

As previously mentioned, the ordered list can be generated from a static list of product listings in a listing database. The static list of product listings allows for a faster retrieval of the search results. Given that most head queries are associated with a static list of product listings, the search experience is enhanced when it is a head query since the search results tend to be more accurate and faster. Additionally, the static list of product listings associated with the first product category is updated periodically based on new user behavior data in the publication system.

Alternatively, the generating of the ordered list at operation 650 can be based on generating an overall list. The overall list has product listings in the first product category. The category predictor 150 can calculate a ranking score for each product listing in the overall list based on the user behavior data 126, the current session data, and the search metrics 127. Subsequently, the ordered list of product listings is generated based on the calculated ranking score for each product listing in the overall list.

At operation 660, the publication system 142 causes a presentation of the generated ordered list of product listings. For example, the generated ordered list of product listings can be included in the search results. The presentation is displayed on the user device 110 of the user 106. The ordered list of product listings can be transmitted by the application server 140 to the user device 110 via the network 104.

Subsequently, after the first product category for the tail query has been determined by the category predictor 150, the category predictor 150 stores an association with the uncommon term and first product category in the search metrics 127. Additionally, the category predictor 150 can store an association with the tail query and the first product category in the search metrics 127. Furthermore, when a second product category for the tail query has been determined, the association between the second product category and the tail query and the association between the second product category and the uncommon term can also be stored in the search metrics.

In some instances, the application server 140 can store the user behavior data 126 in a user behavior database. The user behavior data further includes user interactions with search results pages and product description pages.

In some instances, the search metrics 127 include term-category associations. The term-category association is a set of product categories associated with the common term.

In some instances, the search metrics 127 include impressions, with the impressions being a number of times that the common term and the uncommon term were searched in the publication system.

In some instances, the search metrics 127 include product views, with the product views being a number of times a product listing associated with the common term was viewed.

In some instances, the search metrics 127 include a number of products purchased after being presented a list of product listings associated with the common term.

In some instances, the search metrics 127 include a click-through-rate, with the click-through-rate being a ratio of a user clicking a product listing after being presented a list of product listings associated with the common term.

Figure 7:
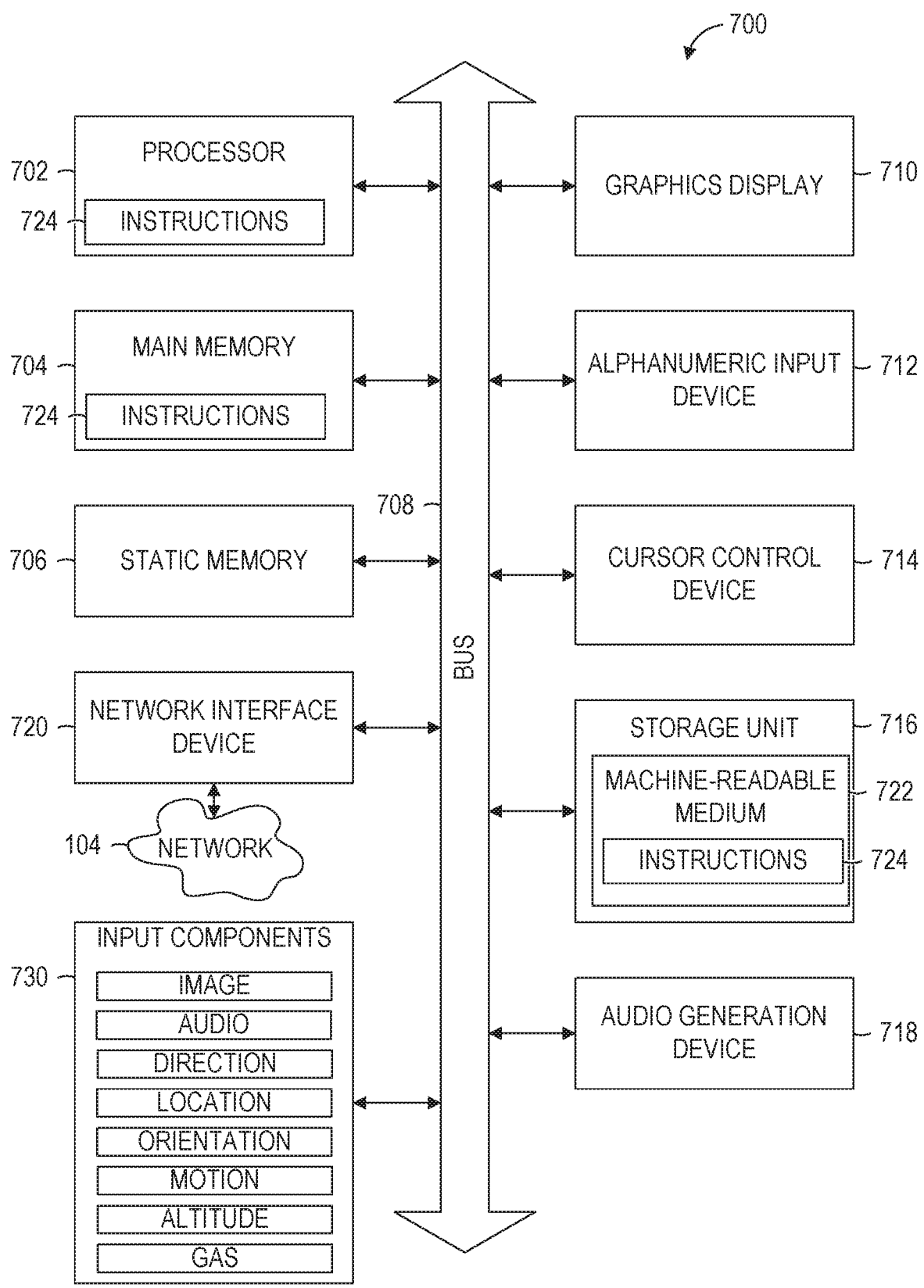
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part. The category predictor 150 is an example of the machine 700.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a PDA, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media 722 (e.g., tangible and non-transitory machine-readable media). The instructions 724 may be transmitted or received over the network 104 via the network interface device 720. For example, the network interface device 720 may communicate the instructions 724 using any one or more transfer protocols (e.g., hypertext transfer protocol (HTTP)).

The machine-readable medium 722 may include a magnetic or optical disk storage device, solid state storage devices such as flash memory, or other non-volatile memory device or devices. The computer-readable instructions 724 stored on the computer-readable storage medium 722 are in source code, assembly language code, object code, or another instruction format that is interpreted by one or more processors 702.

In some example embodiments, the machine 700 may be a portable computing device, such as a smartphone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown, in an example embodiment, to be a single medium, the term "machine-readable medium" should be taken to include a single medium or multiple media (e.g., a centralized or distributed database, or associated caches) able to store the instructions 724. The term "machine-readable medium" shall also be taken to include any medium, or combination of multiple media, that is capable of storing the instructions 724 for execution by the machine 700, such that the instructions 724, when executed by one or more processors 702 of the machine 700 (e.g., the processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory, excluding signals) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and the operations can be performed in a different order than illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 722 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 702 or other programmable processor 702. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 702 configured by software to become a special-purpose processor, the general-purpose processor 702 may be configured as respectively different special-purpose processors (e.g., comprising different hardware modules) at different times. Software (e.g., a software module) may accordingly configure one or more processors 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, a processor 702 being an example of hardware. For example, at least some of the operations of a method may be performed by one or more processors 702 or processor-implemented modules. As used herein, "processor-implemented module" refers to a hardware module in which the hardware includes one or more processors 702. Moreover, the one or more processors 702 may also operate to support performance of the relevant operations in a "cloud computing" environment or as a "software as a service" (SaaS). For example, at least some of the operations may be performed by a group of computers (as examples of machines including processors 702), with these operations being accessible via a network 104 (e.g., the Internet) and via one or more appropriate interfaces (e.g., an API).

The performance of certain operations may be distributed among the one or more processors 702, not only residing within a single machine, but deployed across a number of machines. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the arts. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," such as "and/or," unless specifically stated otherwise.

What is claimed is:

1. A server comprising:
   one or more processors; and
   one or more machine-readable storage media storing modules executed by the one or more processors, the modules comprising:
   a category predictor configured to:
      receive, from a device of a user, a tail query for a product in a publication system, the tail query having one or more common terms and one or more uncommon terms, each of the one or more common terms having a term-category association in a search metrics database, each of the one or more uncommon terms not having a term-category association in the search metrics database;
      access, from the search metrics database, a plurality of product categories associated with the one or more common terms based on the term-category association for each of the one or more common terms;
      access user behavior data, the user behavior data including product views corresponding to past search queries in the publication system; and
      determine a first product category for the tail query by selecting the first product category from the plurality of product categories associated with the one or more common terms based on the user behavior data;
   a listing generator configured to generate an ordered list of product listings using the first product category; and
   a publication system configured to cause a presentation, on a display of the device, of the generated ordered list of product listings.

2. The server of claim 1, wherein the category predictor is further configured to:
   determine the first product category based on statistics derived from the search metrics database; and
   the listing generator is further configured to generate the ordered list based on the statistics derived from the search metrics database.

3. The server of claim 1, wherein the category predictor is further configured to:
   access current session data of a current session for the user, the current session data including a previous search query in the current session; and
   determine the first product category based on the accessed current session data.

4. The server of claim 3, wherein the ordered list of product listings is further based on the current session data.

5. The server of claim 3, wherein the listing generator is further configured to:

generate an overall list, the overall list having product listings in the first product category;

calculate a ranking score for each product listing in the overall list based on the user behavior data and the current session data; and generate the ordered list of product listings based on the calculated ranking score for each product listing in the overall list.

6. The server of claim 1, wherein the category predictor is further configured to:

receive, from the user device, login credentials to initiate the current session; and initiate the current session using the login credentials.

7. The server of claim 1, wherein the category predictor is further configured to:

determine a second product category from the plurality of product categories based on the user behavior data; and wherein the generated ordered list of product listings includes product listings associated with the second product category.

8. The server of claim 1, wherein the category predictor is further configured to:

store an association with at least one of the one or more uncommon terms and the determined first product category in the search metrics database.

9. The server of claim 1, wherein the ordered list is generated from a list of product listings associated with the first product category in a listing database.

10. The server of claim 9, wherein the list of product listings associated with the first product category is updated periodically based on new user behavior data.

11. The server of claim 1, wherein the category predictor is further configured to:

store the user behavior data in a user behavior database, the user behavior data further including user interactions with search results pages and product description pages.

12. The server of claim 1, wherein search metrics in the search metrics database include impressions, the impressions being a number of times that the common term and the uncommon term were searched in the publication system.

13. The server of claim 1, wherein search metrics in the search metrics database include product views, the product views being a number of views a product listing associated with the common term was viewed.

14. The server of claim 1, wherein search metrics in the search metrics database include a number of products purchased after being presented a list of product listings associated with the common term.

15. The server of claim 1, wherein search metrics in the search metrics database include a click-through-rate, the click-through-rate being a ratio of a user clicking a product listing after being presented a list of product listings associated with the common term.

16. A method for querying a database in a publication system, the method comprising:

receiving, from a device of a user, a tail query for a product in the publication system, the tail query having one or more common terms and one or more uncommon terms, each of the one or more common terms having a term-category association in a search metrics database, each of the one or more uncommon terms not having a term-category association in the search metrics database;

accessing, from the search metrics database, a plurality of product categories associated with the one or more common terms based on the term-category association for each of the one or more common terms;

accessing user behavior data, the user behavior data including product views corresponding to past search queries in the publication system;

determining, using a processor, a first product category for the tail query by selecting the first product category from the plurality of product categories associated with the one or more common terms based on the user behavior data;

generating an ordered list of product listings using the first product category; and causing a presentation, on a display of the device, of the generated ordered list of product listings.

17. The method of claim 16, the method further comprising:

accessing current session data of a current session for the user, the current session data including a previous search query in the current session; and wherein the determining of the first product category is further based on the accessed current session data; and wherein the ordered list of product listings is further based on the current session data.

18. A non-transitory machine-readable storage medium comprising instructions that, when executed by one or more processors of a machine, cause the machine to perform operations comprising:

receiving, from a device of a user, a tail query for a product in a publication system, the tail query having one or more common terms and one or more uncommon terms, each of the one or more common terms having a term-category association in a search metrics database, each of the one or more uncommon terms not having a term-category association in the search metrics database;

accessing, from the search metrics database, a plurality of product categories associated with the one or more common terms based on the term-category association for each of the one or more common terms;

accessing user behavior data, the user behavior data including product views corresponding to past search queries in the publication system;

determining a first product category for the tail query by selecting the first product category from the plurality of product categories associated with the one or more common terms based on the user behavior data;

generating an ordered list of product listings using the first product category; and causing a presentation, on a display of the device, of the generated ordered list of product listings.

19. The storage medium of claim 18, wherein the operations further comprise:

accessing current session data of a current session for the user, the current session data including a previous search query in the current session; and wherein the determining of the first product category is further based on the accessed current session data; and wherein the ordered list of product listings is further based on the current session data.

20. The storage medium of claim 18, wherein the operations further comprise:

determining a second product category from the plurality of product categories based on the user behavior data; and wherein the generated ordered list of product listings includes product listings associated with the second product category.

* * * * *